No. 845,926. PATENTED MAR. 5, 1907.
D. BRECK.
PLANT FOR STORING BALED COTTON.
APPLICATION FILED DEC. 31, 1906.

3 SHEETS—SHEET 1.

Witnesses
A. J. McCauley
Wells L. Church

Inventor:
Daniel Breck
by Bakewell & Cornwall
Att'y's.

No. 845,926. PATENTED MAR. 5, 1907.
D. BRECK.
PLANT FOR STORING BALED COTTON.
APPLICATION FILED DEC. 31, 1906.

3 SHEETS—SHEET 2.

Witnesses
A. J. McCauley.
Nello L. Church

Inventor:
Daniel Breck
by Bakewell & Cornwall
Attys.

No. 845,926. PATENTED MAR. 5, 1907.
D. BRECK.
PLANT FOR STORING BALED COTTON.
APPLICATION FILED DEC. 31, 1906.
3 SHEETS—SHEET 3.
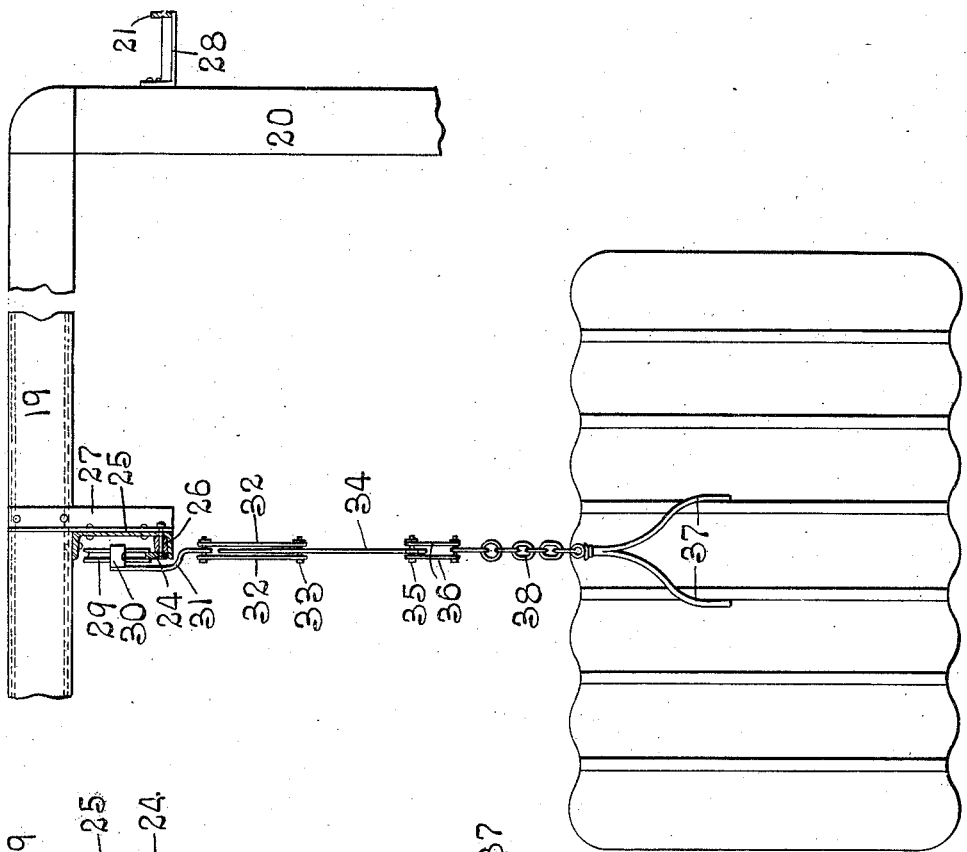
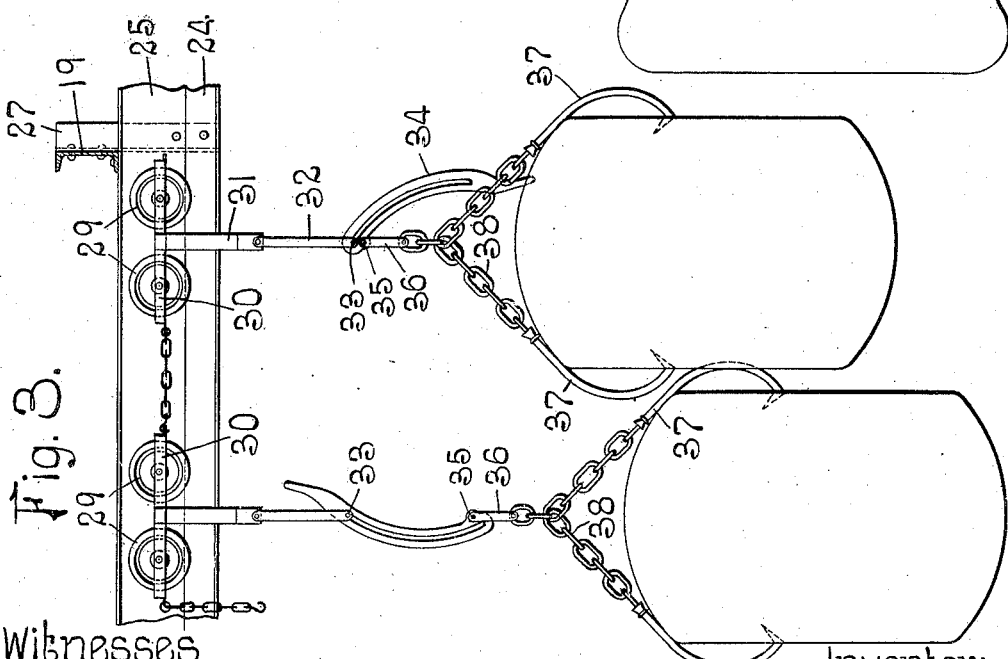
Witnesses
Edgar T. Farmer
Wells L. Church
Inventor:
Daniel Breck
BY Bakewell Cornwall ATT'YS.

UNITED STATES PATENT OFFICE.

DANIEL BRECK, OF ST. LOUIS, MISSOURI.

PLANT FOR STORING BALED COTTON.

No. 845,926.

Specification of Letters Patent.

Patented March 5, 1907.

Application filed December 31, 1906. Serial No. 350,271.

*To all whom it may concern:*

Be it known that I, DANIEL BRECK, a citizen of the United States, residing at St. Louis, Missouri, have invented a certain new and useful Improvement in Plant for Storing Baled Cotton, of which the following is a full, clear, and exact description, such as will enable others skilled in the art to which it appertains to make and use the same, reference being had to the accompanying drawings, forming part of this specification, in which—

Figure 1:
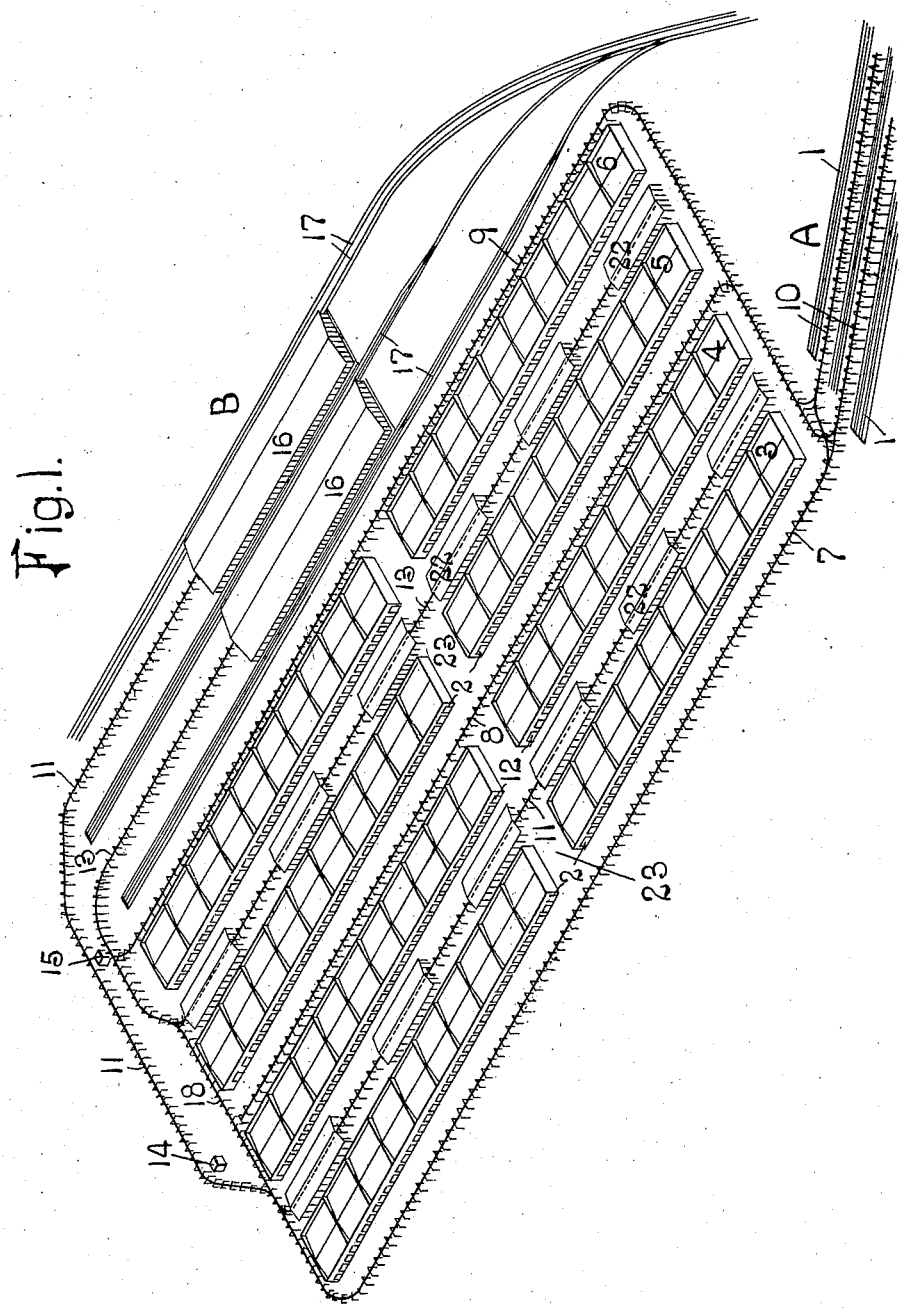
Figure 2:
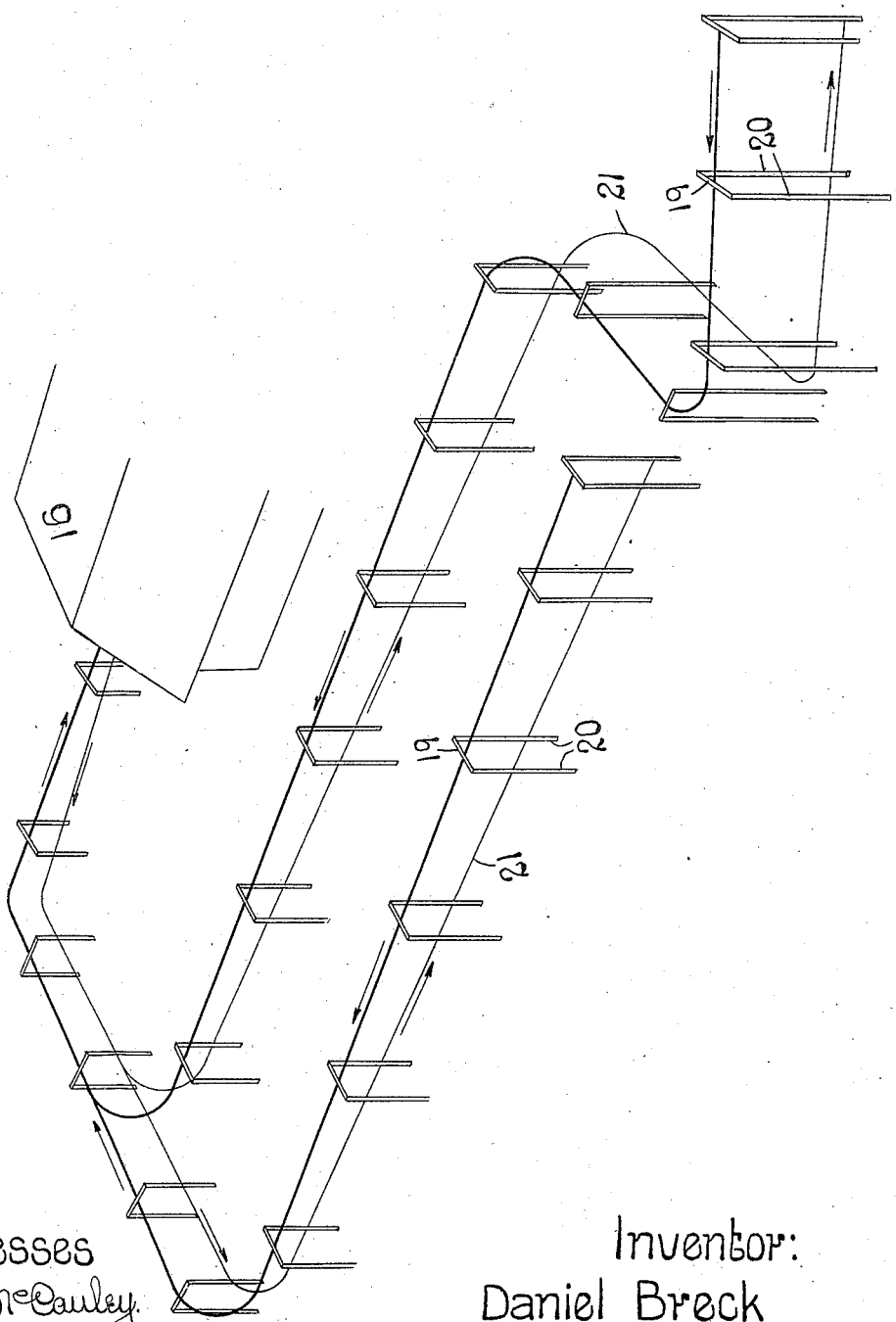

Figure 1 is a perspective view illustrating my improved plant. Fig. 2 is a detail perspective view illustrating the inclined trolley-tracks on which the cotton is conveyed to the shipping-station and the oppositely-inclined tracks upon which the empty trolleys are returned. Fig. 3 is a detail view showing in side elevation the trolley-tracks and the trolleys mounted thereon. Fig. 4 is a detail view taken at approximately a right angle to the view shown in Fig. 3.

This invention relates to a new and useful improvement in a plant for storing baled cotton, the object being to expedite and reduce the cost of handling baled cotton at a warehouse or compress where it is necessary to first unload the cotton from cars, then place it in a warehouse, thereafter convey it to a compress, and then reship it.

The plant herein illustrated and described represents the preferred form of my invention, and consists of a receiving-station, where all of the cars are unloaded; a plurality of warehouses arranged in rows in which the cotton is stored; a cotton-compress, preferably located at one end of the rows of warehouses; a shipping-station; a trolley system for conveying the bales of cotton from the receiving-station to the warehouse, and a second trolley system for conveying the bales from the warehouse to the compress and thereafter to the shipping-station, said trolley being preferably operated by gravity.

Referring to Fig. 1 of the drawing, which represents the preferred form of my invention, A designates the receiving-station, which may consist of one or more platforms, alongside of which railroad-tracks 1 extend, to enable the cotton to be unloaded from the cars onto said platforms. The warehouses, of which there may be any number, are arranged in pairs of rows with the rear doors of the warehouses facing each other, and the tracks of the inbound trolley system extend from the receiving-station past the front doors 2 of said warehouses. The plant shown in Fig. 1 comprises four rows of warehouses 3, 4, 5, and 6, with a track 7 for conveying the cotton from the receiving-station to the warehouse of row 3, a track 8, located between the two rows 4 and 5, and a track 9, extending past the front doors of the warehouse in row 6, all of said tracks connecting with the two tracks 10, extending longitudinally of the platforms at the receiving-station. The track 11 of the outbound trolley system between the rows of warehouses 3 and 4 extends past the rear doors 12 of said warehouses, while the other track 13 of the outbound system is located between the rows 5 and 6.

The compresses, of which there may be any desired number, herein shown as two, which are designated by the reference characters 14 and 15, are located at one end of the rows of warehouses, and the tracks 11 and 13 of the outbound system extend past said compresses and thence to the shipping-station B, shown as consisting of two covered platforms 16, alongside of which the outgoing railroad-tracks 17 extend. Preferably, and as shown in Fig. 1, the tracks 7 and 9 of the inbound trolley system connect with the tracks 11 and 13, respectively, of the outbound system, so that, if desired, bales can be carried from the receiving-station directly to the compresses without first placing them in the warehouse. I also prefer to use a track 18, extending from the junction of the tracks 7 and 11 to the outgoing track 13, so that the bales from the warehouse in rows 3 and 4 can be carried to either compress.

As previously stated, I prefer to operate the trolleys by gravity, and to this end all of the tracks previously referred to are so arranged that they incline downwardly from the receiving-station to the shipping-station, said tracks being connected to the central portion of supports 19, which are carried by standards 20. Suitable switches are provided at the points where the tracks intersect, and for enabling the trolleys to be returned by gravity from the shipping-station to the point from which they started I utilize light-weight tracks 21, that are inclined oppositely to the tracks of the inbound and outbound trolley system, said return tracks being carried by the standards 20, as shown in Figs. 2 and 4.

If desired, sheds 22 may be located between the rear ends of the warehouse in the different rows under which the bales of cotton can be placed preparatory to placing them on the trolleys of the outbound system, and the warehouse can be so arranged that a transversely-extending passage-way 23 bisects the rows.

In Figs. 3 and 4 I have shown in detail the construction of the tracks and the trolleys which travel thereon, each track consisting of a metal rail 24, which rests on the lower flange of a channel 25 and being connected to the web of said channel by means of bolts and fillers 26. The channel is supported by angles 27 depending from the channel-shaped cross-pieces or supports 19, carried by the standards 20, the return track 21 consisting of a rail which is carried by brackets 28, that project laterally from the standards 20. The trolleys consists of two grooved wheels 29, mounted in a frame 30, having a downwardly-extending portion 31, which is so formed that it extends underneath the rail, and thus acts to prevent the trolley from jumping off the track, said downwardly-extending portion carrying two links 32, which are connected at their lower ends by means of a cross-pin 33. A lever 34, provided with a curved slot, is mounted on the cross-pin 33 between the links 32, and fastened to the inner end of said lever by a pivot 35 are links 36, to which cotton-hooks 37 are connected by means of chains 38.

To attach a bale to the trolley, the lever 34 is moved into the position shown at the left of Fig. 3, so that the hooks can grasp the bale resting on the platform. The outer end of the lever 34 is then moved downwardly, and thus elevates the bale into the position shown at the right of Fig. 3, said lever being retained in this position so as to hold the bale elevated, due to the fact that the cross-pin 33, the inner end of the slot in lever 34, and the pin 35, which connects the links 36 to said lever, are all in vertical alinement, so that the lever is relieved from any pressure that would tend to cause its outer end to move upwardly. A long removable handle (not shown) is placed over the end of the lever to enable said lever to be actuated easily for elevating the bale, said handle being removed after the bale has been elevated. The bale can be released from the trolley by a slight upward pressure on the outer end of the lever, which throws the inner end of the slot in said lever out of alinement with the cross-pins 33 and 35, and thus causes said lever to move into the position shown at the left of Fig. 3.

In operation the bales of cotton are unloaded from the cars and placed on the platforms at the receiving-station and are then hooked onto the trolleys which carry the bales by gravity to the front doors of the warehouse in which they are to be stored. When the bales are to be compressed or reshipped, they are removed through the rear doors of the warehouses and are hooked onto the trolleys of the outbound system, which carry them by gravity to the compresses and thence to the shipping-station, where they are loaded into the cars standing on the outgoing railroad-tracks.

From the foregoing description it will be seen that I have devised a plant which reduces to a minimum the hauling and handling of cotton to and from the cars, warehouses, and compresses, and as only a few operatives are required to run the plant a great saving in time and expenses is effected in the storing and compressing of the cotton.

Having thus described the invention, what is claimed as new, and desired to be secured by Letters Patent, is—

1. A plant for storing baled cotton comprising a receiving-station and a shipping-station, a plurality of warehouses located some distance from the receiving-station and arranged in rows with their rear doors facing each other, an inbound trolley system for conveying the cotton from the receiving-station past the front doors of the warehouses and consisting of tracks on which trolleys travel, and an outbound trolley system for conveying the cotton from the rear doors of the warehouses to the shipping-station; substantially as described.

2. In a plant for storing baled cotton, a receiving-station, a shipping-station, a plurality of warehouses arranged in rows, and trolley systems in which the trolleys are operated by gravity for conveying the cotton from the receiving-station to the warehouses and from the warehouses to the shipping-station; substantially as described.

3. In a plant for storing and compressing cotton, a receiving-station, a shipping-station, a plurality of warehouses arranged in rows with their rear doors facing each other, a compress located at one end of said rows, an inclined trolley-track extending from the receiving-station past the front doors of said warehouses, and an inclined trolley-track extending past the rear doors of the warehouses to the compress and to the shipping-station; substantially as described.

4. In a plant for storing and compressing cotton, a receiving-station consisting of a plurality of platforms alongside of which railroad-tracks extend, a shipping-station consisting of a plurality of platforms having railroad-tracks extending alongside of same, warehouses arranged in pairs of rows with their rear doors facing each other, compresses located at one end of said rows, a plurality of inclined trolley-tracks extending from the receiving-station past the front doors of the warehouses in each row, a plurality of inclined trolley-tracks extending past the doors of the warehouses in each row, past the compresses and to the shipping-station, and oppositely-inclined trolley-tracks on which the trolleys are returned to their starting-points; substantially as described.

In testimony whereof I hereunto affix my signature, in the presence of two witnesses, this 27th day of December, 1906.

DANIEL BRECK.

Witnesses:
GEORGE BAKEWELL,
F. R. CORNWALL.